US012798994B2

(12) United States Patent
Beierling et al.

(10) Patent No.: US 12,798,994 B2
(45) Date of Patent: Nov. 17, 2026

(54) METHOD OF MAKING PARTICULATE (OXY)HYDROXIDES, AND PARTICULATE (OXY)HYDROXIDES

(71) Applicant: BASF SE, Ludwigshafen Am Rhein (DE)

(72) Inventors: Thorsten Beierling, Ludwigshafen (DE); Simon Schroedle, Ludwigshafen (DE); Thomas Michael Ryll, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 240 days.

(21) Appl. No.: 18/719,035

(22) PCT Filed: Jan. 6, 2023

(86) PCT No.: PCT/EP2023/050205

§ 371 (c)(1),
(2) Date: Jun. 12, 2024

(87) PCT Pub. No.: WO2023/135055

PCT Pub. Date: Jul. 20, 2023

(65) Prior Publication Data

US 2025/0042769 A1 Feb. 6, 2025

(30) Foreign Application Priority Data

Jan. 17, 2022 (EP) .................................... 22151725

(51) Int. Cl.
*C01G 53/82* (2025.01)
*H01M 4/525* (2010.01)

(52) U.S. Cl.
CPC ............ *C01G 53/82* (2025.01); *H01M 4/525* (2013.01); *C01P 2004/61* (2013.01); *C01P 2004/80* (2013.01); *C01P 2006/40* (2013.01)

(58) Field of Classification Search
CPC .................. H01M 4/505; H01M 4/525; C01P 2004/84; C01G 53/82
See application file for complete search history.

(56) References Cited

U.S. PATENT DOCUMENTS

2018/0190978 A1* 7/2018 Toma .................... C01G 53/50
2019/0214628 A1 7/2019 Choi et al.
2022/0194814 A1* 6/2022 Beierling ................ B01J 4/001

FOREIGN PATENT DOCUMENTS

WO 2020094482 A1 5/2020
WO WO 2020207901 A1 * 10/2020 ............. B01J 19/18
(Continued)

OTHER PUBLICATIONS

International Search Report for PCT/EP2023/050205 dated Mar. 31, 2023, 3 pages.

(Continued)

*Primary Examiner* — Khanh T Nguyen
(74) *Attorney, Agent, or Firm* — Armstrong Teasdale LLP

(57) ABSTRACT

Disclosed herein is a method for making a particulate (oxy)hydroxide of TM, where TM is a combination of nickel and at least one metal selected from Co and Mn, the process including:

(a) providing an aqueous solution (α) containing water-soluble salts of Ni and of at least one transition metal selected from Co and Mn,
(b) combining a solution (α) and a solution (β) and, if applicable, a solution (γ) at a pH value in a range of from 12.0 to 13.0 determined at 23 °C in a continuous stirred tank reactor, thereby creating a slurry of solid particles of a hydroxide containing nickel, and
(c) transferring slurry from step (b) into a batch-wise operated stirred tank reactor where a solution (α) and a solution (β) and optionally a solution (γ) are com- (Continued)

Cross-section micrograph of P-CAM.1

The core and the shell are composed of essentially radially aligned primary particles while a layer of non-orientated primary particles can be seed between core and shell.

bined with the slurry at a pH value in a range of from 11.0 to 12.0 determined at 23 °C.

12 Claims, 2 Drawing Sheets

(56) References Cited

FOREIGN PATENT DOCUMENTS

| | | | |
|---|---|---|---|
| WO | 2021228614 | A1 | 11/2021 |
| WO | 2021244963 | A1 | 12/2021 |

OTHER PUBLICATIONS

Written Opinion for PCT/EP2023/050205 dated Mar. 31, 2023, 4 pages.

* cited by examiner

Figure 1: Cross-section micrograph of P-CAM.1
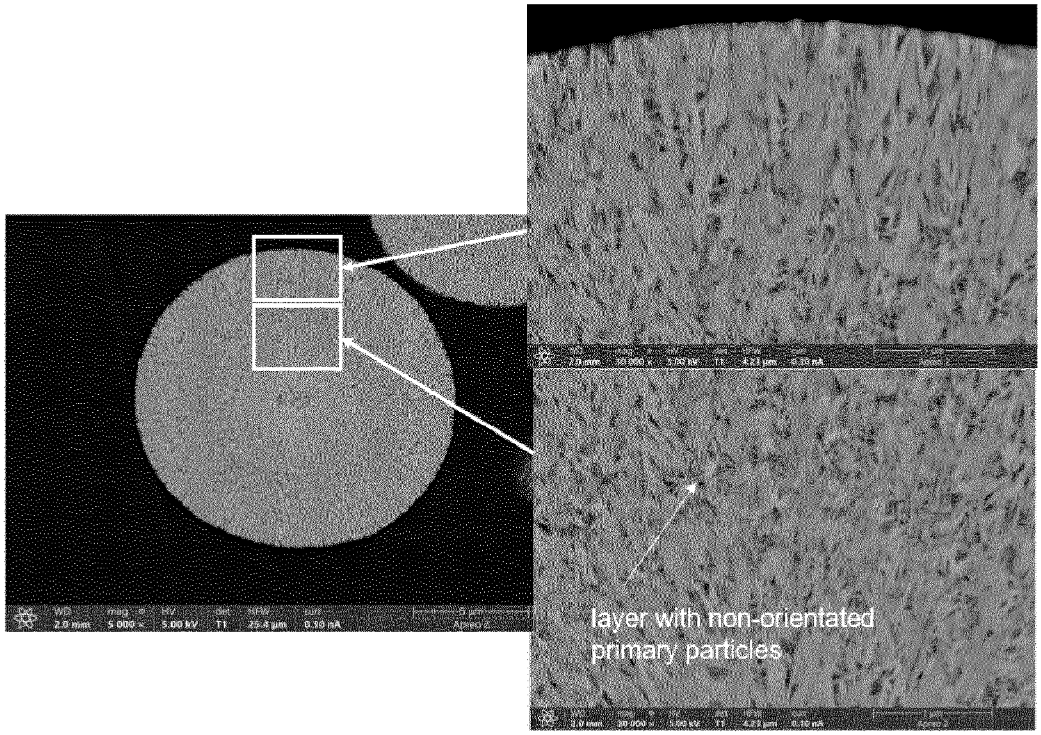
The core and the shell are composed of essentially radially aligned primary particles while a layer of non-orientated primary particles can be seed between core and shell.

Figure 2: Cross-section micrograph of C-P-CAM.2
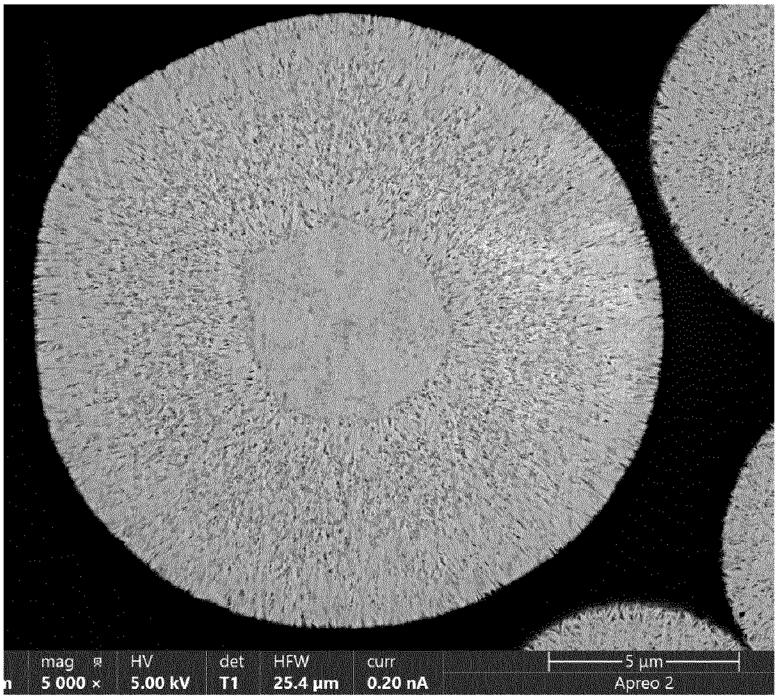
The core of C-P-CAM.2 is formed of non-orientated primary particles

METHOD OF MAKING PARTICULATE (OXY)HYDROXIDES, AND PARTICULATE (OXY)HYDROXIDES

CROSS-REFERENCE TO RELATED APPLICATIONS

This application is a U.S. National Phase Application of International Patent Application No. PCT/EP23/50205, filed Jan. 6, 2023, which claims priority to EP Patent Application No. 22151725.3 filed Jan. 17, 2022, each of which is hereby incorporated by reference herein.

BACKGROUND OF THE INVENTION

Lithiated transition metal oxides are currently used as electrode active materials for lithium-ion batteries. Extensive research and developmental work have been performed in the past years to improve properties like charge density, specific energy, but also other properties like the reduced cycle life and capacity loss that may adversely affect the lifetime or applicability of a lithium-ion battery. Additional effort has been made to improve manufacturing methods.

In a typical process for making cathode materials for lithium-ion batteries, first a so-called precursor is being formed by co-precipitating the transition metals as carbonates, oxides or preferably as hydroxides that may or may not be basic, for example oxyhydroxides. The precursor is then mixed with a source of lithium such as, but not limited to LiOH, $Li_2O$ or $Li_2CO_3$ and calcined (fired) at high temperatures. Lithium salt(s) can be employed as hydrate(s) or in dehydrated form. The calcination—or firing—often also referred to as thermal treatment or heat treatment of the precursor—is usually carried out at temperatures in the range of from 600 to 1000 °C. During the thermal treatment a solid-state reaction takes place, and the electrode active material is formed. The thermal treatment is performed in the heating zone of an oven or kiln.

To a major extent, properties of the precursor translate into properties of the respective electrode active material to a certain extent, such as particle size distribution, content of the respective transition metals and more. It is therefore possible to influence the properties of electrode active materials by steering the properties of the precursor.

It is an objective of the present invention to provide a process that allows the production of a highly spherical precursor with narrow particle size distribution. It was further an objective of the present invention to provide a precursor for an electrode active material that wherein such precursor can be made easily.

BRIEF SUMMARY OF THE INVENTION

The present invention is directed towards a method for making a particulate (oxy)hydroxide of TM wherein refers to a combination of nickel and at least one metal selected from Co and Mn and wherein said process comprises the steps of:

(a) Providing an aqueous solution (α) containing water-soluble salts of Ni and of at least one transition metal selected from Co and Mn, and, optionally, at least one further metal selected from Ti, Zr, Mo, W, Al, Mg, Nb, and Ta, and an aqueous solution (β) containing an alkali metal hydroxide and, optionally, an aqueous solution (γ) containing ammonia, (b) combining a solution (α) and a solution (β) and, if applicable, a solution (γ) at a pH value in the range of from 12.0 to 13.0 determined at 23 °C in a continuous stirred tank reactor, thereby creating solid particles of a hydroxide containing nickel, said solid particles being slurried, (c) transferring slurry from step (b) into a batch-wise operated stirred tank reactor where a solution (α) and a solution (β) and, if applicable, a solution (γ) are combined with the slurry at a pH value in the range of from 11.0 to 12.0 determined at 23 °C, wherein each of the stirred tank reactor(s) is equipped with a solid-liquid separation device, for example a clarifier or filtration device, in particular at least one candle filter, through which mother liquor is withdrawn from the stirred tank reactor(s).

BRIEF DESCRIPTION OF THE DRAWINGS

FIG. 1. Cross-section micrograph of P-CAM.1. The core and the shell are composed of essentially radially aligned primary particles while a layer of non-orientated primary particles can be seed between core and shell.

FIG. 2. Cross-section micrograph of C-P-CAM.2. The core of C-P-CAM.2 is formed of non-orientated primary particles.

DETAILED DESCRIPTION OF THE INVENTION

Accordingly, the process as defined at the outset has been found, hereinafter also defined as "inventive process" or "process according to the (present) invention". The inventive process comprises at least three steps, hereinafter also referred to as step (a), step (b) and step (c), or—even more briefly—(a), (b), and (c), respectively. The inventive process may include further—optional—steps. Steps (a) to (c) are described in more detail below. By the inventive process, a highly spherical precursor with narrow particle size distribution is obtained with favorably oriented primary particles that lead to a high density of precursors made by the inventive process.

The inventive process is a process for making a particulate (oxy)hydroxide or of TM. Said particulate (oxy)hydroxide then serves as a precursor for electrode active materials, and it may therefore also be referred to as precursor.

In one embodiment of the present invention, the resultant precursor is comprised of secondary particles that are agglomerates of primary particles.

In one embodiment of the present invention the specific surface (BET) of the resultant precursor is in the range of from 2 to 70 $m^2/g$, determined by nitrogen adsorption, for example in accordance with to DIN-ISO 9277:2003-05. The outgassing temperature is 120 °C.

The precursor is an (oxy)hydroxide of TM wherein TM comprises Ni and at least one metal selected from Co and Mn and Al, and, optionally, at least one further metal selected from Ti, Zr, Mo, W, Mg, and Nb.

In one embodiment of the present invention, TM is a combination of metals according to general formula (I)

$$(Ni_aCo_bMn_c)_{1-d}M_d \quad (I)$$

with a being in the range of from 0.6 to 0.95, preferably from 0.8 to 0.94, b being in the range of from 0.025 to 0.2, preferably from 0.025 to 0.15, c being in the range of from zero to 0.2, preferably from zero to 0.15, and d being in the range of from zero to 0.1, M is selected from Mg, Al, Ti, Zr, Mo, W, Al, Mg, Nb, and Ta, a+b+c=1, and b+c>zero or M includes Al and d>zero.

In another embodiment of the present invention, TM corresponds to general formula (II)

$$(Ni_aCo_bMn_c)_{1-d}M_d \quad (II)$$

with a being in the range of from 0.25 to 0.4, b being in the range of from zero to 0.2, c being in the range of from 0.6 to 0.75, and d being in the range of from zero to 0.1, M is selected from Mg, Al, Ti, Zr, Mo, W, Al, Mg, Nb, and Ta, $$a+b+c=1.$$

In each case, TM may contain traces of further metal ions, for example traces of ubiquitous metals such as sodium, iron, calcium or zinc, as impurities but such traces will not be taken into account in the description of the present invention. Traces in this context will mean amounts of 0.05 mol-% or less, referring to the total metal content of TM.

The precursors are particulate materials. In one embodiment of the present invention, precursors have an average particle diameter D50 in the range of from 3 to 20 μm, preferably from 4 to 16 μm. The average particle diameter may be determined, e. g., by light scattering or LASER diffraction or electroacoustic spectroscopy. The particles are composed of primary particles, in particular they are agglomerates of primary particles, and the above particle diameter refers to the secondary particle diameter.

In one embodiment of the present invention, the span of the particle diameter distribution of the precursor is in the range of from 0.9 to 2.0. The span is defined as [(D90)−(D10)]/(D50), with the values of (D90), (D50) and (D10) being determined by dynamic light scattering.

Said particulate material may have an irregular shape but in a preferred embodiment, said particulate material has a regular shape, for example spheroidal or even spherical. The aspect ratio may be in the range of from 1 and 10, preferably from 1 to 3 and even more preferably from 1 to 1.5. The aspect ratio is defined as the ratio of width to length or specifically the particle diameter in the longest dimension versus the particle diameter in the shortest dimension. Perfectly spherical particles have an aspect ratio of 1.

Step (a) includes providing at least one aqueous solution (α) containing water-soluble salts of Ni and of at least one transition metal selected from Co and Mn, and, optionally, at least one further metal selected from Ti, Zr, Mo, W, Al, Mg, Nb, and Ta, and an aqueous solution (β) containing an alkali metal hydroxide and, optionally, an aqueous solution (γ) containing a complexing agent, for example ammonia.

The term water-soluble salts of cobalt and nickel or manganese or of metals other than nickel and cobalt and manganese refers to salts that exhibit a solubility in distilled water at 25 °C of 25 g/l or more, the amount of salt being determined under omission of crystal water and of water stemming from aquo complexes. Water-soluble salts of nickel and cobalt and manganese may preferably be the respective water-soluble salts of $Ni^{2+}$ and $Co^{2+}$ and $Mn^{2+}$. Examples of water-soluble salts of nickel and cobalt are the sulfates, the nitrates, the acetates and the halides, especially chlorides. Preferred are nitrates and sulfates, of which the sulfates are more preferred.

The term "water-soluble compounds of aluminum" then refers to compounds like $Al_2(SO_4)_3$, $Al(NO_3)_3$, $KAl(SO_4)_2$, $NaAlO_2$ and $NaAl(OH)_4$. Depending on the choice of water-soluble com-pound of aluminum, the pH value of aqueous solution (α) may be in the range of from 1 to 3 or above 13.

Examples of suitable compounds of Mg are $MgSO_4$, $Mg(NO_3)_2$, magnesium acetate and $MgCl_2$, with $MgSO_4$ being preferred.

Examples of suitable compounds of Ti are $Ti(SO_4)_2$, $TiOSO_4$, $TiO(NO_3)_2$, $Ti(NO_3)_4$, with $Ti(SO_4)_2$ being preferred.

Examples of suitable compounds of Zr are zirconium acetate, $Zr(SO_4)_2$, $ZrOSO_4$, $ZrO(NO_3)_2$, $Zr(NO_3)_4$, with $Zr(SO_4)_2$ being preferred.

Examples of suitable compounds of Nb are $(NH_4)Nb(C_2O_4)_3$ and $(NH_4)NbO(C_2O_4)_2$. Examples of suitable compounds of Mo are $MoO_3$, $Na_2MoO_4$, and $(NH_4)_2MoO_4$.

Examples of suitable compounds of W are $WO_3$, $WO_3 \cdot H_2O$, $Na_2WO_4$, ammonium tungstate and tungstic acid.

Solution (α) may have a pH value in the range of from 2 to 5. In embodiments wherein higher pH values are desired, ammonia may be added to solution (α). However, it is preferred to not add ammonia to solution (α). In case it is intended to provide a solution containing $NaAlO_2$ and $NaAl(OH)_4$ it is preferred to provide at least two aqueous solutions, one containing nickel and at least one of cobalt and manganese and, optionally, at least one of Ti, Zr, Mo, W, Mg, Nb, and Ta, and another aqueous solution containing $NaAlO_2$ or $NaAl(OH)_4$.

The concentration of nickel and other constituents of TM, as the case may be, can be selected within wide ranges. Preferably, the respective total metal concentration is selected to be within a range of 1 to 1.8 mol of the metal/kg of solution, more preferably 1.3 to 1.7 mol of the metal/kg of solution.

In addition, in step (a) an aqueous solution of alkali metal hydroxide is provided, hereinafter also referred to as solution (β). Examples of alkali metal hydroxides are potassium hydroxide and a combination of sodium and potassium hydroxide, and even more preferred is sodium hydroxide.

In one embodiment of the present invention, solution (β) mainly contains alkali metal hydroxide and some amount of carbonate, e.g., 0.1 to 2% by weight, referring to the respective amount of alkali metal hydroxide, added deliberately or by aging of the solution (β) or the respective alkali metal hydroxide.

Solution (β) may have a concentration of hydroxide in the range from 0.1 to 12 mol/l, preferably 6 to 10 mol/l.

The pH value of solution (β) is preferably 13 or higher, for example 14.5.

Solution (γ) contains a complexing agent. Examples of complexing agents are ammonia and organic acids or their alkali or ammonium salts wherein said organic acid bears at least two functional groups per molecule and at least one of the functional groups is a carboxylate group.

Examples of organic acids that bear two identical functional groups are adipic acid, oxalic acid, succinic acid and glutaric acid. An example of organic acids that bears three identical functional groups is citric acid.

In one embodiment of the present invention, said organic acid is selected from malic acid, tartaric acid, citric acid, and glycine.

In one embodiment of the present invention, the concentration of complexing agent(s) in solution (γ) is in the range of from 1 to 30% by weight. In embodiments wherein the complexing agent is selected from ammonia its concentration is preferably in the range of from 10 to 30% by weight. In embodiments wherein the complexing agent(s) is or are selected from organic acids or their alkali or ammonium salts wherein said organic acid bears at least two functional groups per molecule and at least one of the functional groups is a carboxylate group, the concentration of said complexing agent in solution (γ) may be in the range of from 0.2 to 10% by weight.

More preferred complexing agent is ammonia.

In steps (b) and (c), solution (α) and solution (β) and—if applicable—solution (γ) are combined, under precipitation of a hydroxide. They are combined in at least two stirred tank reactors that are each equipped with a solid-liquid separation device through which mother liquor is removed. Said mother liquor contains the counterions of the metals of TM as well as alkali metal ions from the base in solution (β). Examples of sold-liquid separation units are clarifiers such as lamella clarifiers and filtration devices such as filter presses, hydrocyclones, and filters such as at least one candle filter. With the use of one or more of such solid-liquid separation devices, slurries with a solids content of up to 1200 g/l may be obtained.

The percentage of mother liquor withdrawn in steps (b) and (c) may be in the range of from 200 to 1,200 g/l, preferably 800 to 1,200 g/l. However, despite the withdrawal of mother liquor, the slurry is still well stirrable.

Step (b) includes combining solution(s) (α) and solution (β) and, if applicable, solution (γ), in a continuous reactor, thereby creating solid particles of a hydroxide of TM. Said solid particles are slurried.

In one embodiment of the present invention, the particles resulting from step (b) have an average diameter in the range of from 2 to 10 μm.

In step (b), the pH value of the liquid phase of the slurry is in the range of from 12.0 to 13.0. The pH value is determined at 23 °C in the liquid phase.

In one embodiment of the present invention, the average hydraulic residence time of the slurry in step (b) is in the range of from 30 minutes to 12 hours, preferably in the range from 1 to 8 hours, more preferred in the range of 2 to 6 hours In one embodiment of the present invention, step (b) is performed at a temperature in the range from 10 to 85 °C, preferably at temperatures in the range from 20 to 70 °C.

In one embodiment of the present invention, step (b) is performed at constant pressure, for example at ambient pressure. In other embodiments, step (b) is performed at elevated pressure, for example up to 50 bar.

In one embodiment of the present invention, extra mother liquor is removed from the continuous reactor during step (b). The mother liquor contains water and alkali metal salts. The counter ion of alkali is then the counter ion of nickel and of the metals other than nickel. If for example, nickel sulfate is used as water-soluble salt of nickel in solution (α) and sodium hydroxide in solution (β), then the mother liquor contains sodium sulfate.

In one embodiment of the present invention, the solids content of the slurry that is transferred to step (c) —or to the storage vessel, see below—is in the range of from 200 to 1200 g/l. Before the start-up of step (c), slurry from step (b) is preferably diluted in the reactor wherein step (c) is performed, for example with de-ionized water or with mother liquor, to 2 to 100 g/l. The solids content may be determined by density measurements or ICP (inductively coupled plasma) or by Coriolis meters and refers to the slurried particles. Dissolved compounds such as, but not limited to $Na_2SO_4$ are neglected in this context.

In one embodiment of the present invention, step (b) —as well as step (c) —is performed under an inert atmosphere, for example nitrogen or a rare gas such as argon. Oxygen-depleted air, for example with up to 2% by weight of $O_2$, is feasible as well, especially when TM does not contain manganese. Due to the strong alkalinity of solution (β), $CO_2$ is not a suitable atmosphere.

In step (c), slurry from step (b) is transferred into a continuously or preferably batch-wise operated stirred tank reactor wherein a solution (α) and a solution (β) and, if applicable, a solution (γ) are combined with the slurry at a pH value in the range of from 11.0 to 12.0.

In step (c), the pH value of the liquid phase of the slurry is in the range of from 11.0 to 12.0. The pH value is determined at 23 °C.

Solution (α) and a solution (β) and, if applicable, solution (γ) in step (c) are defined as above. They may have the same composition as their equivalents in step (b) or different—but in the framework of the definition as set out above, for example, one of them contains a water-soluble salt of nickel and at of least one of cobalt and manganese. In such cases, they are also referred to as solutions (α') and a solution (β') and, if applicable, solution (γ'), respectively. Preferably, however, the compositions of solutions (α) in steps (b) and (c) are identical in composition.

Even more preferably, the compositions of solutions (α) insteps (b) and (c) are identical as well as the compositions of solutions (β).

In one embodiment, wherein step (c) is performed in a batch-wise operated stirred tank reactor, the composition of solution (α) —or (α'), as the case may be—varies in the course of step (c), for example the concentrations of nickel and cobalt or manganese. In another embodiment of the present invention, the composition of solution (α) —or (α'), as the case may be—remains constant.

In one embodiment of the present invention, the duration of step (c) is in the range of from 30 minutes to 80 hours, preferably in the range from 10 to 70 hours, more preferred in the range of 15 to 60 hours.

In one embodiment of the present invention, step (c) is performed at a temperature in the range from 10 to 85 °C, preferably at temperatures in the range from 20 to 60 °C.

In one embodiment of the present invention, step (c) is performed at constant pressure, for example at ambient pressure. In other embodiments, step (b) is performed at elevated pressure, for example up to 50 bar.

In one embodiment of the present invention, the inventive process is carried out in a cascade of at least two stirred tank reactors of which the first stirred tank reactor is equipped with an overflow system through which slurry is removed from the first stirred tank reactor and transferred to the second stirred tank reactor, directly or indirectly.

In a preferred embodiment, slurry is removed from the continuous stirred tank reactor in which step (b) is carried out and transferred to a stirred storage vessel where the slurry is stored under stirring for a time period of from 15 minutes to 24 hours, preferably from 30 minutes to 10 hours, before being transferred to the second stirred tank reactor. Said operation is also referred to as storage step. In the course of the storage step, neither solution (α) nor solution (β) nor solution (γ) is added. Said storage is preferably under inert gas, vide supra.

In one embodiment of the present invention, the temperature during the storage step is in the range of from 20 to 70 °C, preferably 30 to 60 °C.

In one embodiment of the present invention, the pH value of the slurry in the storage vessel is in the range of from 10.0 to 13.0 determined at 23 °C, preferably from 12.0 to 12.5.

In one embodiment of the present invention, at the same time in the range of from 5 to 30 vol-%, preferably 10 to 20 vol-% of slurry are in the storge vessel and 70 to 95 vol-%, preferably 80 to 90 vol-% of slurry are in the tank reactors wherein steps (b) and (c) are performed. In this context, the amount of slurry being located in any piping or related part is neglected.

In one embodiment of the present invention, the slurry in the storage vessel is occasionally stirred, for example with an average energy input of from 0.2 to 1 W/l. Said occasional stirring is useful for avoiding sedimentation of the solids of the slurry.

By performing the inventive process, solid particles of a hydroxide or oxyhydroxide are created, said solid particles being slurried. Thus, a slurry is obtained. Preferably, said slurry has a solids content in the range of from 200 to 1,200 g/l.

In one embodiment of the present invention, a clarifier or at least one candle filter is used to mother liquor withdrawal. Such candle filter(s) is/are connected to the stirred vessel in a way that mother liquor may be removed easily but the solids are held back in the stirred vessel.

Further steps may be performed subsequently to step (c), for example, work-up steps (d). An example of work-up steps (d) is to remove the particles of (oxy)hydroxide by a solid-liquid separation method, for example filtration.

In such a step (d), the particles from step (c) are separated from the liquid phase by a solid-liquid separation method, preferably by filtration or in a centrifuge. The liquid phase may also be termed mother liquor. Filtration may be performed, e.g., on a belt filter or in a filter press.

In order to remove mother liquor, it is preferred to wash the filter cake, for example with water or with alkali metal hydroxide or alkali metal carbonate solution.

Filtration may be supported by suction or by pressure.

Step (d) may be performed at any temperature at which water is in the liquid state, for example 5 to 95 °C, preferred is 20 to 60 °C.

By performing step (d), a solid material is obtained which is a particulate (oxy)hydroxide or oxide of TM. Said material usually has a high water content, for example 1 to 30% by weight, and may be dried, e.g. at air, at a temperature in the range of from 80 to 150 °C, or at reduced pressure ("in vacuo"), to a moisture content in the range of from 100 to 5,000 ppm, ppm being ppm by weight. The water content may be determined by drying in vacuo at a temperature of 100 °C until the weight is remaining unchanged. The moisture content may be determined by Karl-Fischer titration.

Subsequently to step (d) or to drying, said particulate (oxy)hydroxide or oxide of TM may be subjected to a step (e). Step (e) includes a thermal treatment of the solid from step (d) in a rotary kiln or in a flash calciner.

In one embodiment of step (e), the wet solid material is introduced into the rotary kiln by a chute or a vibrating chute, by a spiral conveyor or a screw conveyor, preferably by a screw conveyor with a single screw or multiple screws.

A further aspect of the present invention refers to particulate (oxy)hydroxide of TM, hereinafter also referred to as inventive (oxy)hydroxides or inventive precursors. Inventive precursors are advantageously made according to the inventive process.

In inventive (oxy)hydroxide, TM refers to a combination of nickel with of at least one metal selected from cobalt and manganese, wherein said inventive (oxy)hydroxide has an average particle diameter (d50) in the range of from 3 to 20 µm, preferably 4 to 16 µm, and a core-shell structure wherein both core and shell show an essentially radial alignment of platelet-shaped primary particles, and wherein core and shell are separated by a porous layer that contains randomly arranged primary particles.

The porous layer may be detected by scanning electron microscopy ("SEM") or transmission electron microscopy ("TEM"). In said porous layer, usually only few voids may be detected. Preferably, said porous layer between core and shell has an average thickness in the range of from 0.1 to 1.0 µm.

The portion of radially aligned primary particles may be determined, e.g., by SEM (Scanning Electron Microscopy) of a cross-section of at least 5 secondary particles.

"Essentially radially alignment" does not require a perfect radial orientation but includes that in an SEM analysis, a deviation to a perfectly radial orientation is at most 5 degrees.

Furthermore, at least 70% of the secondary particle volume is filled with radially oriented primary particles. Preferably, only a minor inner part, for example at most 30%, preferably at most 20%, of the volume of those particles is filled with non-radially oriented primary particles, for example, in random orientation.

In the porous layer, preferably the share of voids is more than 10% if determined by choosing 5 representative particles in SEM and calculating the In one embodiment of the present invention, inventive (oxy)hydroxides have a particle size distribution with a span [(d90)−(d10)]/(d50) in the range of from 0.2 to 0.6. The diameters (D10), (D50) and (D90) may be determined by dynamic light scattering.

In one embodiment of the present invention, TM in inventive (oxy)hydroxides is a combination of metals according to general formula (I)

$$(Ni_aCo_bMn_c)_{1-d}M_d \qquad (I)$$

with a being in the range of from 0.6 to 0.95, preferably from 0.8 to 0.94, b being in the range of from 0.025 to 0.2, c being in the range of from zero to 0.2, and d being in the range of from zero to 0.1, M is selected from Mg, Al, Ti, Zr, Mo, W, Al, Mg, Nb, and Ta, $$a+b+c=1.$$

In another embodiment of the present invention, TM in inventive (oxy)hydroxides is a combination of metals according to general formula (II)

$$(Ni_aCo_bMn_c)_{1-d}M_d \qquad (II)$$

with a being in the range of from 0.25 to 0.4, b being in the range of from zero to 0.2, c being in the range of from 0.6 to 0.75, and d being in the range of from zero to 0.1, M is selected from Mg, Al, Ti, Zr, Mo, W, Al, Mg, Nb, and Ta, $$a+b+c=1.$$

Inventive (oxy)hydroxides are preferably obtained according to the inventive process. Inventive (oxy)hydroxides are excellent starting materials for cathode active materials which are suitable for producing batteries with a high volumetric energy density and excellent cycling stability. Such cathode active materials are made by mixing with a source of lithium, e.g., LiOH or $Li_2O_2$ or $Li_2CO_3$, followed by calcination, for example at a temperature in the range of from 600 to 1000 °C. Especially in embodiments wherein TM of inventive (oxy)hydroxides corresponds to formula (I), said calcination is preferably performed in an atmosphere of oxygen or oxygen-enriched air, for example with at least 60 vol-% of oxygen, preferably 80 vol-% of oxygen and more preferably at least 90 vol-% oxygen. In embodiments wherein TM of inventive (oxy)hydroxides corresponds to formula (II), said calcination may be performed in air atmosphere.

Examples of suitable set-ups for said calcination are rotary kilns, roller hearth kilns, and pusher kilns.

By performing a calcination in the above way, the essentially radial alignment of primary particles is—e.g., to at least 80%, preferably to at least 90%—retained, and cathode active materials with excellent capacity retention are obtained.

The invention is further illustrated by working examples and by a drawing.

Brief description of the drawing, FIG. 1:

Schematic set-up. Reactor A for step (b), a stirred tank reactor with a clarifier, for withdrawal of mother liquor. The bottom valve is not shown.

The aging tank is in the middle. Reactor B for performing step (c) is on the right, with a clarifier.

I. Synthesis of Precursors

General: The Following Set-Up is Used:

A 3.2 liter stirred tank reactor ("first precipitation reactor" or "Reactor A"), equipped with baffles and a cross-arm stirrer with a diameter of 0.06 m, and a cylinder-shaped clarifier made from glass through which mother liquor can be withdrawn from Reactor A. Reactor A in addition has a bottom valve.

Reactor A is equipped with an overflow system that leads to an aging tank with a stirrer, volume: 25 l. The aging tank is connected to the second precipitation tank (or "Reactor B"), volume 3.2 liter stirred tank reactor with baffles and a cross-arm stirrer with a diameter of 0.06 m, and a cylinder-shaped clarifier made from glass.

Both clarifiers are equipped with a pump can re-introduce paste-like residue with a very high solids content from the lower part of the glass cylinder-shaped clarifier back into the respective reactor.

Rpm: Revolutions Per Minute

The following aqueous solutions were provided, step (a.1):

Solution (α.1): $NiSO_4$, $CoSO_4$ and $MnSO_4$ dissolved in deionized water (molar ratio 91:4.5:4.5, total transition metal concentration: 1.65 mol/kg)

Solution (β.1): 25 wt % NaOH dissolved in deionized water

Solution (γ.1): 25 wt % ammonia in deionized water

I.1 Synthesis of an Inventive Precursor P-CAM.1

Reactor A of the set-up described above is charged with 1.6 l deionized water containing 15 g ammonia and heated to 55 °C. Subsequently, solution (β.1) is added in a way that the pH value at 23 °C is set to 12.18 and the stirrer is set to 700 rpm.

Step (b.1) Reactor A is then continuously fed with solutions (α.1), (β.1) and (γ.1) in a way that the pH value of the mother liquor at 23 °C is 12.2, measured at 23 °C, and the molar ratio of $NH_3$ to the sum of Ni and Co and Mn in Reactor A is 0.22. The precipitation is conducted under an atmosphere of $N_2$. The individual flow rates of the solutions are adjusted to meet a hydraulic residence time of 5 hours.

In the course of step (b.1), particle free mother liquor was continuously withdrawn from the Reactor A by the clarifier while the concentrated slurry is returned into Reactor A. The pump of the clarifier is operated in a way that less than 10% of total particle mass is present in the clarifier. The mass flow of withdrawn mother liquor is 65% of the feed mass flow. In parallel to mother liquor withdrawal, the forming slurry is continuously discharged from the Reactor A via a free overflow and collected in the aging tank. By this approach, the solid content of the slurry in the Reactor A is increased to 395 g/l and kept constant during the continuous operation of step (b.1).

The resulting slurry with mean particle size (d50) of 4.2 μm is collected in the stirred aging tank. After a residence time of one day, parts of this slurry are transferred to Reactor B which is charged with 55 °C solution containing 20 g ammonia with a pH value measured at 23 °C of 11.4.

Step (c.1): Then, dosage of solutions (α.1), (β.1) and (γ.1) is started. The individual flow rates of the solutions are adjusted to meet a hydraulic residence time of 5 hours. Over a precipitation time of 21 hours, mother liquor is continuously withdrawn from the slurry resulting in a high solids slurry that was finally removed from Reactor B through a bottom valve.

Then, the slurry is separated by filtration, washed with deionized water and solution (β1), and dried at 120 °C for 16 hours to obtain the precursor P-CAM.1 with molar composition of Ni:Co:Mn=91:4.5:4.5, an average particle size (d50)=13.4 μm and span=0.42. The precursors show an excellent sphericity with a form factor of 0.989. Furthermore, SEM analyses of P-CAM.1 shows a core-shell structure with essentially radial alignments of platelet-shaped primary particles in the core and the shell, and a porous layer between the core and the shell in which the primary particles are randomly oriented.

I.2 Synthesis of a Comparative Precursor, C-P-CAM.2

Step (a.2): The same solutions (α.1), (β.1) and (γ.1) as in I.1 were used.

Step c-(b.2): A 3.2 l-stirred tank reactor similar to Reactor A but without clarifier is charged with 1.6 l deionized water containing 7 g ammonia and heated to 55 °C. Subsequently, solution (β.1) is added in a way that the pH value measured at 23 °C is set to 12.2, and the stirrer is set to 1000 rpm. The tank reactor is then continuously fed with solutions (α.1), (β.1) and (γ.1) in a way that the pH value of the mother liquor at 23 °C is 12.2 and the molar ratio of $NH_3$ to the sum of Ni and Co and Mn in the reactor is 0.1. The process is conducted under inert gas atmosphere. The individual flow rates of the solutions are adjusted to meet a hydraulic residence time of 5 hours.

The slurry with an average particle size (d50) of 4.1 μm was continuously discharged via a free overflow and collected in the aging tank. The slurry had a solid content of 125 g/l.

After 24 hours, parts of this slurry are transferred to Reactor B which is charged with 55 °C solution containing 20 g ammonia with a pH value measured at 23 °C of 11.4. This 2nd reactor was also equipped with a mother liquor withdrawal device but had no free overflow.

Step (c.2): Then, dosage of solutions (α.1), (β.1) and (γ.1) is started. The individual flow rates of the solutions are adjusted to meet a hydraulic residence time of 5 hours. Over a precipitation time of 21 h mother liquor was continuously withdrawn from the slurry resulting in a high solids slurry that was finally removed from Reactor B through a bottom valve.

The collected slurry was separated by filtration, washed with deionized water and with solution (β.1), and dried at 120 °C for 16 hours to obtain the comparative precursor C-P-CAM.2 with molar composition of Ni:Co:Mn=91:4.5:4.5, an average particle size (d50)=13.2 μm, determined by LASER diffraction, and a span=0.45. Compared to P-CAM.1, the sphericity was lower with a form factor of 0.974. Furthermore, only the shell of comparative precursor C-P-CAM.2 showed a radial alignment of platelet-shaped primary particles while the core consisted of randomly oriented primary particles.

II. Manufacture of Inventive and Comparative Cathode Material

II.1 Preparation of Dehydrated Metal Oxide Precursors 50 g of P-CAM.1 was heated in a Linn oven for 2 hours at 450 °C under flowing air. The metal oxide P-CAM.O.1 had an average particle diameter (D50) of 13.3 μm and a span of 0.39.

For comparison purposes, 50 g of C-P-CAM.2 was heated in a Linn oven for 2 hours at 450 °C under flowing air. The metal oxide C-P-CAM.O.2 had an average particle diameter (D50) of 13.1 μm and a span of 0.42

II.2 Calcination and Post-Treatments 30 g of P-CAM.O.1 was mixed with LiOH monohydrate (molar ratio Li/metal=1.02), 133 mg $TiO_2$ and 122 mg $ZrO_2$ for 15 minutes in a grinding mill. A saggar was charged with the resultant mixture and transferred into a Linn oven. The temperature was raised at rate of 2 C/min to 750 °C under flowing oxygen and then held constant at 750 °C for 8 hours and subsequently allowed to naturally cool under flowing oxygen. The resultant powder was then deagglomerated in a grinding mill and sieved. After de-agglomeration, the powder had an average particle diameter (D50) of 13.2 μm, a span of 0.37 and an average form factor of 0.991.

30 g powder was then added to 15 ml deionized water stirred for 2 minutes and then immediately filtered on a Buchner funnel to remove water. The wet filter cake was then dried under an $N_2$ atmosphere with reduced pressure at 120 °C for 10 hours.

The resultant powder was then dry coated with boric acid by mixing 30 g powder, mixing media and 30 mg boric acid for 40 minutes at low speed on a roller mill. A saggar was charged with the dried powder and heat treated in Linn oven. The Linn oven was heated to 300 °C for 2 hours under oxygen atmosphere and allowed to cool naturally. Inventive CAM.1 was obtained.

The comparative oxide PCAM C-P-CAM.O.2 was treated in the same way and C-CAM.2 was obtained. After de-agglomeration, the resultant powder had an average particle diameter (D50) of 13.0 μm, a span of 0.41 and an average form factor of 0.973.

III. Testing of Cathode Active Material

III.1 Cathode Manufacture

Positive electrode: PVDF binder (Solef® 5130) was dissolved in NMP (Merck) to produce a 7.5 wt. % solution. For electrode preparation, binder solution (3 wt. %), graphite (SFG6L, 2 wt. %), and carbon black (Super C65, 1 wt.-%) were suspended in NMP. After mixing using a planetary centrifugal mixer (ARE-250, Thinky Corp.; Japan), either inventive CAM.1 or C-CAM.2 (94 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 mg/$cm^2$. All electrodes were dried at 105 °C for 7 hours before battery assembly.

III.2 Electrolyte Manufacture

A base electrolyte composition was prepared containing 12.7 wt % of $LiPF_6$, 26.2 wt % of eth-ylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

III.3 Coin Cell Manufacture

Coin-type half cells (20 mm in diameter and 3.2 mm in thickness) comprising a cathode prepared as described under II.1.1 and lithium metal as working and counter electrode, respectively, were assembled and sealed in an Ar-filled glove box. In addition, the cathode and anode and a separator were superposed in order of cathode/separator/Li foil to produce a half coin cell. Thereafter, 0.15 mL of the EL base 1 which is described above (III.2) were introduced into the coin cell.

III.4 Cycling Tests

The initial performance, C-rate performance and cycling performance were measured as follows: Coin half cells according to III.3 were tested in a voltage range between 4.3 V to 2.8 V at room temperature. For the initial cycles, the initial lithiation was conducted in the CC-CV mode, i.e., a constant current (CC) of 0.1 C was applied until reaching 4.3V, followed by the CV step until the current dropped to 0.01 C. After 10 min resting time, reductive lithiation was carried out at constant current of 0.1 C up to 2.8 V. For the C-rate test charge and discharge rates were adjusted accordingly. For the cycling test, the constant current was chosen to be 1C until 100 cycles were reached. The results are summarized in Table 1.

TABLE 1

Physical and electrochemical data of cathode active materials. The pressed densities were determined at 250 MPa

| | D50 μm | Span | 1st Discharge mAh/g | 0.1 C rate capacity mAh/g | Press density g/$cm^3$ |
|---|---|---|---|---|---|
| CAM.1 | 13.2 | 0.37 | 228.6 | 225.8 | 3.42 |
| C-CAM.2 | 13.0 | 0.41 | 225.7 | 222.3 | 3.29 |

The invention claimed is:

1. A process for making a particulate (oxy)hydroxide of TM, wherein TM is a combination of metals according to general formula (I)

$$(Ni_aCo_bMn_c)_{1-d}M_d \quad (I)$$

wherein a is in a range of from 0.6 to 0.95, b is in a range of from 0.025 to 0.2, c is in a range of from zero to 0.2, and d is in a range of from zero to 0.1, wherein M is selected from the group consisting of Mg, Al, Ti, Zr, Mo, W, Nb, and Ta, and $a+b+c=1$, or wherein TM is a combination of metals according to general formula (II)

$$(Ni_aCo_bMn_c)_{1-d}M_d \quad (II)$$

wherein a is in a range of from 0.25 to 0.4, b is in a range of from zero to 0.2, c is in a range of from 0.6 to 0.75, and d is in a range of from zero to 0.1, wherein M is selected from the group consisting of Mg, Al, Ti, Zr, Mo, W, Nb, and Ta, and $a+b+c=1$, and wherein said process comprises the steps of:

(a) providing one or more aqueous solution(s) (α) containing water-soluble salts of Ni and of at least one transition metal selected from the group consisting of Co and Mn, and, optionally, at least one further metal selected from the group consisting of Ti, Zr, Mo, W, Al, Mg, Nb, and Ta, and an aqueous solution (β) containing an alkali metal hydroxide and, optionally, an aqueous solution (γ) containing a complexing agent, (b) combining solution(s) (α) and solution (β) and, if applicable, solution (γ) at a pH value in a range of from 12.0 to 13.0 determined at 23 °C in a continuously operated stirred tank reactor, thereby creating solid particles of hydroxide, said solid particles being slurried, and (c) transferring slurry from step (b) into a stirred tank reactor wherein a solution (α) and a solution (β) and, optionally, a solution (γ) are combined with the slurry at a pH value in a range of from 11.0 to 12.0 determined at 23 °C, wherein the stirred tank reactor of step (b) and the stirred tank reactor of step (c) are each equipped with a solid-liquid separation device through which mother liquor is withdrawn.

2. The process according to claim 1, wherein the process is carried out in a cascade of at least two stirred tank reactors of which a first stirred tank reactor of the at least two stirred tank reactors is equipped with an overflow system through which slurry is removed from the first stirred tank reactor and transferred to a second stirred tank reactor of the at least two stirred tank reactors, directly or indirectly.

3. The process according to claim 1, wherein the slurry is removed from the continuous stirred tank reactor and transferred to a stirred storage vessel where the slurry is stored under stirring for a time period of from 15 minutes to 24 hours before being transferred to the second stirred tank reactor.

4. The process according to claim 3, wherein the temperature in the stirred storage vessel is in a range of from 20 to 70 °C.

5. The process according to claim 3, wherein the pH value of the slurry in the storage vessel is in a range of from 10.0 to 13.0, determined at 23 °C.

6. The process according to claim 3, wherein at the same time in a range of from 5 to 30 vol-% of slurry are in the storge vessel and 70 to 95 vol-% of the slurry are in the tank reactors wherein steps (b) and (c) are performed.

7. The process according to claim 1, wherein in at least one of steps (b) and (c), a coaxial nozzle is used for addition of solution (α) and solution (β) or solution (α) and solution (γ).

8. The process according to claim 1, wherein in at least one of steps (b) and (c), a clarifier or at least one candle filter is used to mother liquor withdrawal.

9. The process according to claim 1, wherein steps (b) and (c) are each performed in an inert atmosphere selected from the group consisting of rare gases and nitrogen.

10. A particulate (oxy)hydroxide of TM, wherein TM is a combination of metals according to general formula (I)

$$(Ni_aCo_bMn_c)_{1-d}M_d \quad (I)$$

wherein a is in a range of from 0.6 to 0.95, b is in a range of from 0.025 to 0.2, c is in a range of from zero to 0.2, and d is in a range of from zero to 0.1, wherein M is selected from the group consisting of Mg, Al, Ti, Zr, Mo, W, Nb, and Ta, and $a+b+c=1$, or wherein TM is a combination of metals according to general formula (II)

$$(Ni_aCo_bMn_c)_{1-d}M_d \quad (II)$$

wherein a is in a range of from 0.25 to 0.4, b is in a range of from zero to 0.2, c is in a range of from 0.6 to 0.75, and d is in a range of from zero to 0.1, wherein M is selected from Mg, Al, Ti, Zr, Mo, W, Nb, and Ta, and $a+b+c=1$, wherein said particulate (oxy)hydroxide has an average particle diameter (d50) in a range of from 3 to 20 μm and a core-shell structure wherein both core and shell show an essentially radial alignment of platelet-shaped primary particles and wherein the core and the shell are separated by a porous layer that contains randomly arranged primary particles.

11. The particulate (oxy)hydroxide according to claim 10, having a particle size distribution with a span [(d90)−(d10)]/(d50) in a range of from 0.2 to 0.6.

12. The particulate (oxy)hydroxide according to claim 10, wherein the porous layer between the core and the shell has an average thickness in a range of from 0.1 to 1.0 μm.

* * * * *